United States Patent [19]

Michel et al.

[11] Patent Number: 4,923,300

[45] Date of Patent: May 8, 1990

[54] DEFRACTION PHOTOELECTRIC POSITION MEASURING SYSTEM

[75] Inventors: Dieter Michel, Traunstein, Fed. Rep. of Germany; Olivier Parriaux, Lausanne; Guy Voirin, Neuchatel, both of Switzerland

[73] Assignee: Dr. Johannes Heidenhain GmbH, Traunreut, Fed. Rep. of Germany

[21] Appl. No.: 161,455

[22] Filed: Feb. 18, 1988

[30] Foreign Application Priority Data

Feb. 21, 1987 [DE] Fed. Rep. of Germany ....... 3705653

[51] Int. Cl.$^5$ ................................................ G01B 9/02
[52] U.S. Cl. .................................. 356/356; 350/96.12
[58] Field of Search ...................... 356/356; 350/96.12, 350/96.19

[56] References Cited

U.S. PATENT DOCUMENTS

| | | | |
|---|---|---|---|
| 3,900,264 | 8/1975 | Heitmann et al. | 356/356 |
| 4,047,795 | 9/1977 | Hughes et al. | 350/96.19 |
| 4,286,838 | 9/1981 | Huignard et al. | 350/96.12 |
| 4,629,886 | 12/1986 | Akiyama et al. | |
| 4,717,255 | 1/1988 | Ulbers | 350/96.12 |
| 4,743,083 | 5/1988 | Schimpe | 350/96.12 |
| 4,746,186 | 5/1988 | Nicia | 350/96.12 |

FOREIGN PATENT DOCUMENTS

| | | |
|---|---|---|
| 0006482 | 1/1980 | European Pat. Off. . |
| 3316144 | 11/1983 | Fed. Rep. of Germany . |
| 59-164914 | 10/1983 | Japan . |
| 1270875 | 4/1972 | United Kingdom . |
| 2146765 | 4/1985 | United Kingdom . |

OTHER PUBLICATIONS

"3x2 Channel Waveguide Gyroscope Couplers: Theory", Burns et al., Journal of Quantum Electronics, 10-1982, pp. 1790-1796.
"Theory of Prism-Firm Coupler and Thin-Film Light Guides", J. Optical Soc. of America, vol. 60, (1970), pp. 1325-1337, Tien, et al.

Primary Examiner—Vincent P. McGraw
Assistant Examiner—S. A. Turner
Attorney, Agent, or Firm—Willian Brinks Olds Hofer Gilson & Lione

[57] ABSTRACT

Several photoelectric position measuring systems are described which utilize diffraction gratings to define the reference magnitude. Diffracted component beams are introduced by means of coupling-in gratings that have different grid constants from one another into optical waveguides to a coupler and there brought into interference. The interfering component beams are conducted from the outputs of the coupler via optical waveguides to detectors which transform them into electrical signals which are phase-shifted with respect to one another. Displacement of the diffraction grating is a measure for the position change to be measured of one machine component mounted for translation relative to another.

13 Claims, 4 Drawing Sheets

DEFRACTION PHOTOELECTRIC POSITION MEASURING SYSTEM

BACKGROUND OF THE INVENTION

This invention relates to photoelectric position measuring systems for measuring the relative position of two objects, of the type which utilize a diffraction grating to generate at least two diffracted component beams.

West German DE-OS No. 33 16 144 and Japanese unexamined patent specification JP-OS No. 59-164 914 describe two measuring systems of the general type described above. In such systems the diffraction grating defines the reference magnitude. A diffraction grating is made up of very thin grating lines that lie closely adjacent to one another, for example on a glass or metal plate. Such gratings may be formed by mechanical processing techniques, by photolithographic techniques, or by electron beam lithography. Such measuring systems further include a light source that emits monochromatic light, two reflector mirrors, and a detector on the side of the diffraction grating opposite the light source. Diffracted beams from the grating are brought into interference, and the detector is responsive to the resulting interference pattern. The light beam emitted from the light source is diffracted by the diffraction grating and passed. If one assumes that the diffraction grating is moved with respect to another part of the optical system (such as the light source and the reflector mirrors), then the output signal of the detector in response to the interference pattern moves through two periods when the diffraction grating moves through one period.

In another arrangement the light beam emitted from the light source is diffracted by the diffraction grating, and light beams of the same order with different signs (+or −) overlap and interfere with one another. For example a semipermeable mirror may be provided before the light enters the detector. As before, relative movement occurs between the diffraction grating and another part of the optical system. As explained above, the interference pattern moves through two periods while the diffraction grating moves through one period.

One important problem in the design of such measuring systems is to accommodate the required optical system in a small space. The optical system can easily become extensive, so that a relatively large physical layout is required.

U.S. patent application Ser. No. 07/077,190 filed on July 24, 1987 discloses a measuring system which is simple in construction and which largely eliminates disturbances caused by environmental influences, thereby providing dependable operation. The advantages of this measuring system are that it provides a compact construction in a system with high integration capacity and with excellent security with respect to environmental influences.

SUMMARY OF THE INVENTION

The present invention is directed to an improved position measuring system of the general type described above, which provides optical components arranged such that an extremely small structural size is provided transversely to the measuring direction.

According to this invention a photoelectric position measuring system for measuring the relative position of two objects is provided, of the type including a light emitting radiation source which defines a beam direction; at least one diffraction grating shiftable transversely to the beam direction for generating at least two diffracted component beams; two optical waveguides; two coupling-in elements configured to introduce the component beams into the waveguides; a coupler having at least two inputs and at least one output, each of said coupler inputs being configured to receive a respective one of the component beams from the associated waveguide to bring the component beams into interference; and at least one detector responsive to an optical signal on the output of the coupler to produce at least one electrical signal. According to this invention, this photoelectric position measuring system is provided with at least two coupling-in gratings, each included in a respective one of the coupling-in elements to introduce the respective component beam into the associated waveguide, wherein the coupling-in gratings are each characterized by a respective grid constant, and wherein the grid constants differ from one another. The dependent claims define further features of the preferred embodiments.

The invention will be explained in the following detailed description with preferred embodiments that are illustrated in the drawings. It should be clearly understood that the drawings of FIGS. 1–4 are not drawn to scale, but are exaggerated so as to make features of the embodiments perceptible to the unaided eye. One skilled in the field of integrated optics with knowledge of the present invention will be able to provide the necessary dimensions and positional allocations required for actual practice. For the same reason the beam paths and the diffraction images have been represented symbolically rather than in precise optical detail.

DETAILED DESCRIPTION OF THE PRESENTLY PREFERRED EMBODIMENTS

Figure 1:
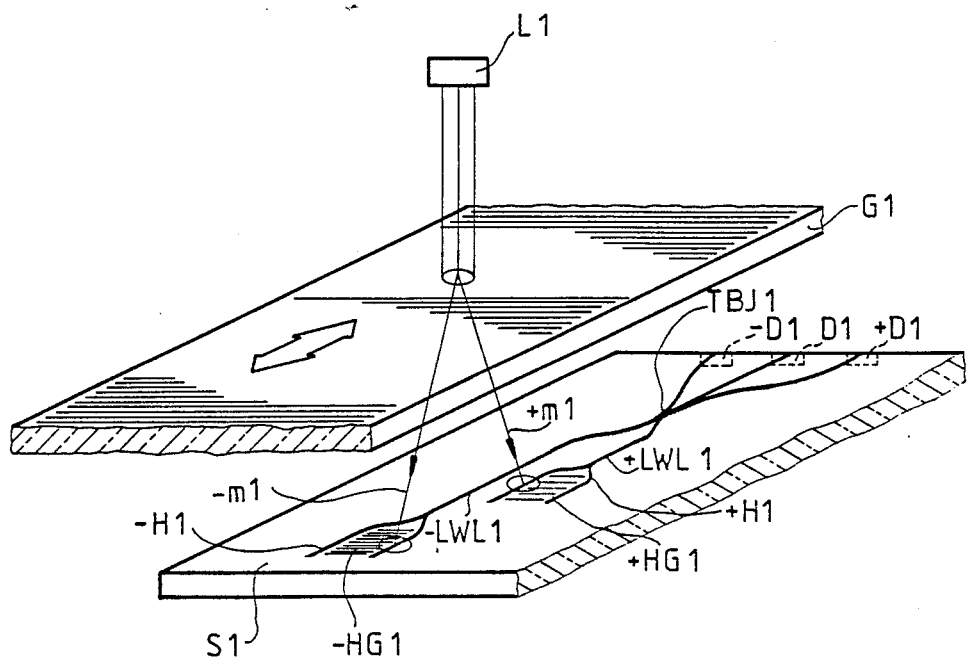
FIG. 1 shows a position measuring system which incorporates a first preferred embodiment of this invention, in which the coupling-in elements are offset along the measuring direction with respect to one another.

Turning now to the drawings. FIG. 1 shows a position measuring system which includes a diffraction grating G1 whose position is to be measured with respect to a substrate S1.

A semiconductor laser L1 directs an incident beam of radiation onto the diffraction grating G1, and the diffraction grating G1 splits up the incident beam into a number of component beams $+m1$, $-m1$, which are of the same diffraction order but opposite sign.

The component beams $+m1$ and $-m1$ fall upon the substrate S1. A number of optical elements are disposed on the substrate S1 including two coupling-in elements +H1 and −H1, two optical waveguides +LWL1, −LWL1, an optical coupler TBJ1, as well as three photodectectors +D1, D1, −D1. In this embodiment all of these optical elements are formed as an integrated optical circuit on the substrate S1.

In this embodiment the coupling-in elements H1, −H1 are formed as adiabatic horns, the structure of which is defined in U.S. patent applications Ser. No. 07/148,556, filed on Jan. 26, 1988 and Ser. No. 07/077,190 filed on July 24, 1987. The coupling-in elements +H1, −H1 are oriented in the longitudinal direction of the diffraction grating G1 and are positioned transversely with respect to the line of symmetry running in the measuring direction. The two coupling-in elements +H1, −H1 are displaced with respect to one another in the measuring direction on the substrate S1. Each of the coupling-in elements H1, −H1 includes a respective coupling-in grating +HG1, −HG1, the grating lines of which are oriented in the same direction as the grating lines of the diffraction grating G1. Of key importance however, is that the diffraction grid constants of the two coupling-in gratings +HG1, −HG1 are different from one another. This difference in the grid constants of the two coupling-in gratings +HG1, −HG1 is important because the coupling-in conditions of the diffracted component beams +m1, −m1 are different.

Through the combination of structural features described above a position measuring system is provided that has a substantially smaller size (measured transversely to the measuring direction) than the embodiments shown in U.S. patent application Ser. No. 07/077,190 filed on July 24, 1987.

Figure 2:
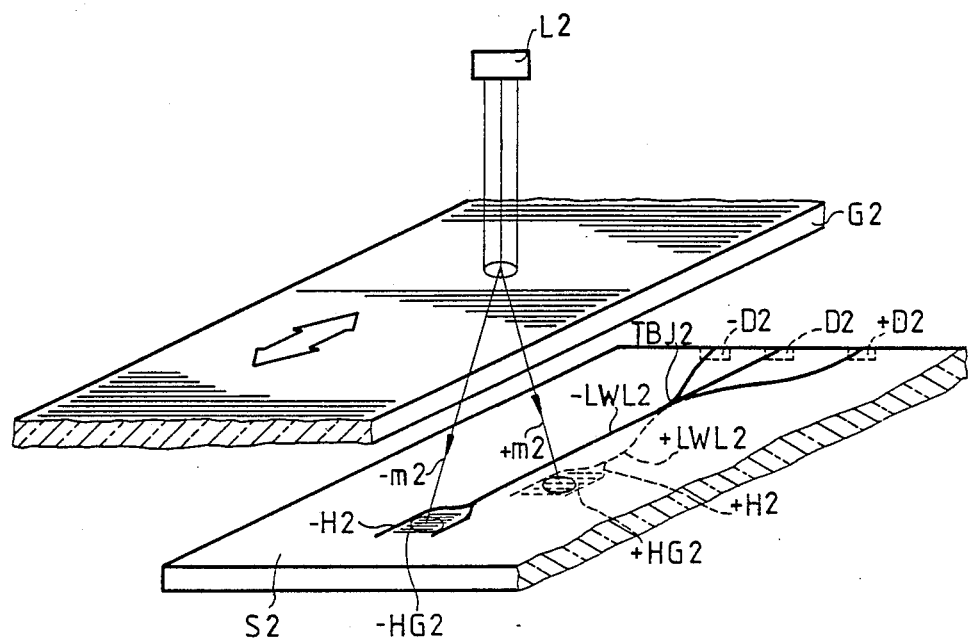
FIG. 2 shows a position measuring system which incorporates a second preferred embodiment of this invention, in which the coupling-in elements lie in separate planes.

FIG. 2 shows a second embodiment of this invention which provides the same advantages as those discussed above. Since many of the components are the same as those shown in FIG. 1, the same reference symbols are used, supplemented with index numbers corresponding to the figure numbers. A semiconductor laser L2 illuminates a diffraction grating G2, which generates diffracted component beams +m2, −m2, which impinge upon coupling-in elements +H2, −H2 on a substrate S2. The coupling-in element +H2 has a coupling-in grating +HG2, whose grid constant differs from that of the coupling-in grating −HG2, which is a component of the second coupling-in element −H2. An important feature of this embodiment is that the coupling-in element +H2 with its coupling-in grating +HG2 lies in a separate plane (here in a lower plane) than the coupling-in element −H2 with its coupling-in grating −HG2. The coupling-in gratings +HG2, −HG2 as well as the optical waveguides +LWL2, −LWL2 are formed in such a way that they do not reciprocally influence each other. The component beams +m2, −m2 are brought into interference in a well known manner in a coupler TBJ2 and are applied via the outputs of the coupler TBJ2 to detectors +D2, D2 and −D2.

Figure 3:
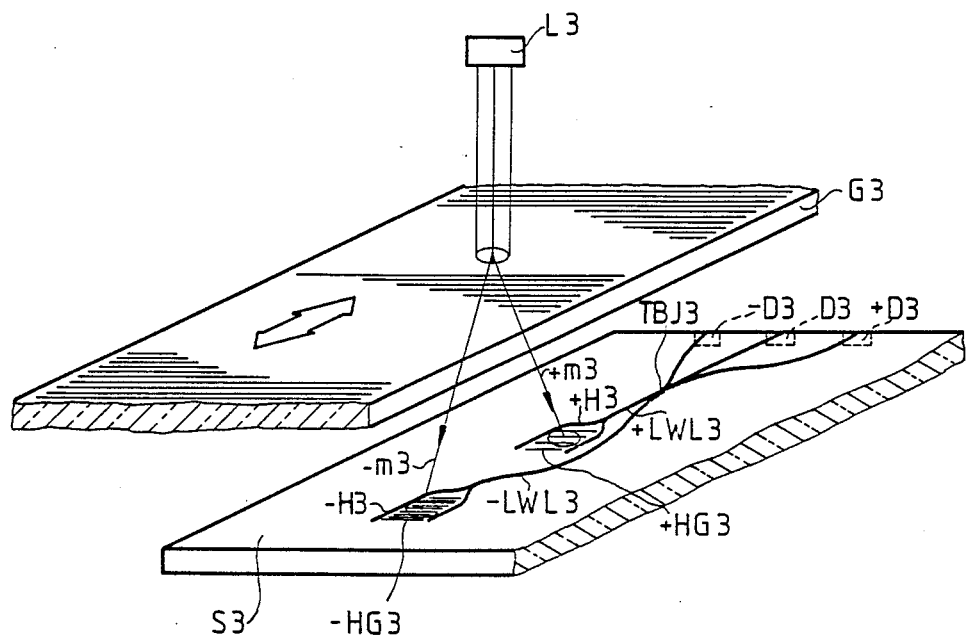
FIG. 3 shows a position measuring system which incorporates a third preferred embodiment of this invention, in which the coupling-in elements are positioned one behind the other along the measuring direction and the optical waveguides are not all rectilinear.

The embodiment shown in FIG. 3 has two coupling-in elements +H3, −H3 with their respective coupling-in gratings +HG3, −HG3, which again have different grid constants from one another. The coupling-in elements +H3 and −H3 both lie in a single plane parallel to the diffraction grating G3 and in alignment, with one positioned directly behind the other in the measuring direction. An optical waveguide −LWL3 (which leads from the coupling-in element −H3 to the coupler TBJ3) is led past the other coupling-in element +H3 and united in the coupler TBJ3 with an optical waveguide +LWL3 that leads from the coupling-in element +H3 to the coupler TBJ3. Outputs of the coupler TBJ3 lead to detectors +D3, D3 and −D3. The couplers TBJ1, TBJ2, TBJ3 can be laid out in such a way that on their three outputs there stand signals which are phase-shifted with respect to one another. The signals may be phase-shifted with respect to one another in each case through 120°, but it is also possible for signals to stand on two outputs which represent sine and cosine functions with a reference signal standing on the third output. The signals on the outputs are likewise led by optical waveguides to detectors, by which they are transformed into electrical signals and applied to an electronic evaluating circuit (not shown).

Figure 4:
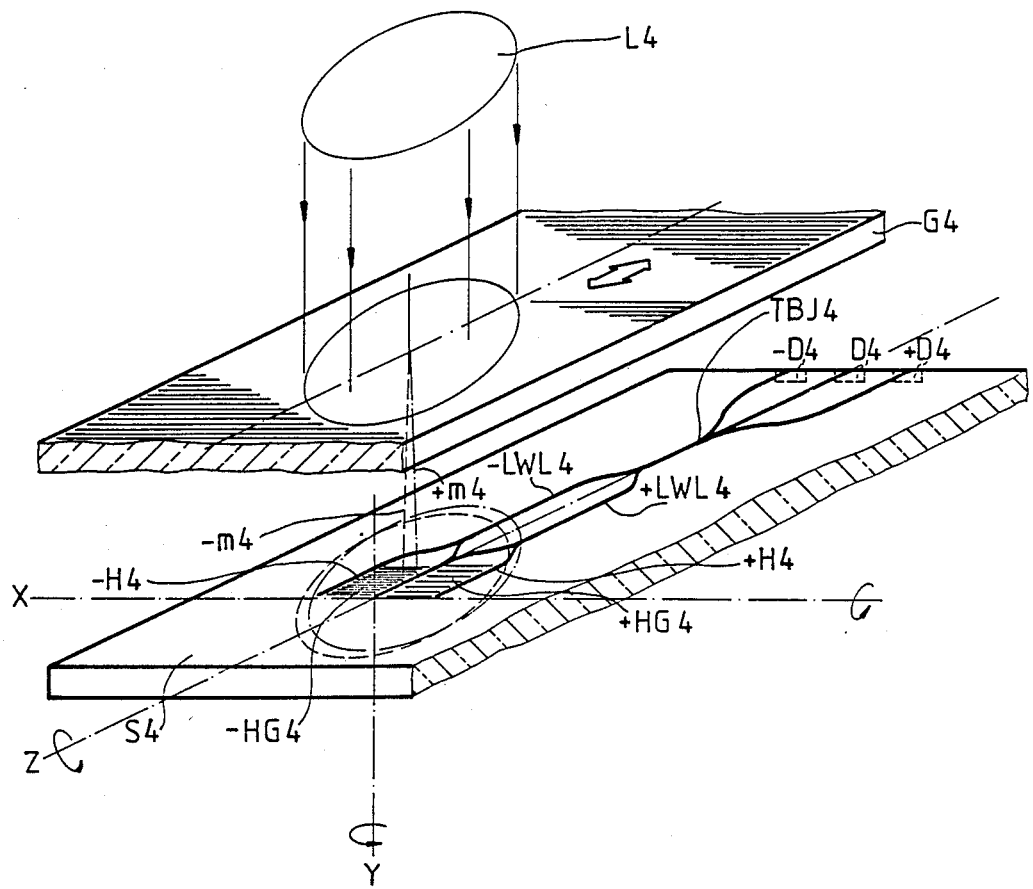
FIG. 4 shows a position measuring system which incorporates a fourth preferred embodiment of this invention, in which the coupling-in elements are positioned parallel to one another.

FIG. 4 shows a fourth preferred embodiment which includes a substrate S4 that supports two coupling-in elements +H4, −H4 which run in the same direction as the diffraction grating G4 but are shifted transversely to the symmetry line running along the In contrast to the embodiment shown in FIG. 1, the coupling-in elements +H4, −H4 are not displaced with respect to one another along the measuring direction.

In FIG. 4 the reference symbol L4 designates a beam emanating from a laser (not shown). The beam L4 has been shown with an exaggeratedly large dimension in order to show that the two component beams +m4, −m4 must travel over the same optical path length from the scanning field illuminated by the beam L4 on the diffraction grating G4.

As the beam path (represented in dot-and-dashed line) of the diffracted component beam +m4 symbolizes, it is oppositely diffracted, as is the beam path (represented in dashed line) of the component beam −m4.

It is apparent from FIG. 4 that the coupling-in elements +H4, −H4 with their coupling-in gratings HG4, −HG4 are not offset with respect to one another that the two diffracted component beams +m4, −m4 proceeding from the beam L4 are shifted with respect to one another in the measuring direction, as shown in FIG. 4 with dot-and-dashed and dashed lines, respectively.

The coupling-in elements +H4, −H4 are reflected, so to speak, with respect to the axis of symmetry, which is symbolized by the Z-axis. This reflection does not relate to the grating constants of the coupling-in gratings +HG4, −HG4. These grating constants are different from one another, as in the embodiments discussed above.

An X, Y, Z coordinate system has been plotted in FIG. 4 in order better to establish the geometric relations. This establishment of coordinates holds as well for FIGS. 1, 2 and 3, though the axes have not been drawn in these figures. In the example of FIG. 4 it is clear that rotation of the substrate S4 about the X-axis has no influence and rotation about the Z-axis has only a very minimal influence on the measurement result, since the displacement of the two coupling-in elements +H4, −H4 transversely to the Z-axis can be kept very small (about 100 microns). Furthermore, the separation between the diffraction grating G4 and the substrate S4 can be kept constant such that there is no relative displacement of these elements along the Z-axis.

Furthermore, the influence of temperature fluctuations and vibrations of the substrate is extremely slight. The embodiment shown in FIG. 4 has the further advantage that when the diffraction grating G4 is aligned parallel to the substrate S4 the diffracted component beams +m4, −m4 provide virtually the same path length to the coupler TBJ4, so that optical sources with short coherence length can be used.

In position measuring systems of the type described herein the movements of the diffraction grating are transformed in the manner described above into generally digitally displayed position measurement values for the machine movements to be measured.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a photoelectric position measuring system for measuring the relative position of two objects, of the type comprising: a light emitting radiation source which defines a beam direction; at least one diffraction grating shiftable transversely to the beam direction for generating at least two refracted component beams; two optical waveguides; two coupling-in elements configured to introduce the component beams into the waveguides; a coupler having at least two inputs and at least one output, each of said coupler inputs configured to receive a respective one of the component beams from the associated waveguide to bring the component beams into interference, and at least one detector responsive to an optical signal on the output of the coupler to produce at least one electrical signal; the improvement comprising:

at least two coupling-in gratings, each included in a respective one of the coupling-in elements to introduce the respective component beam into the associated waveguide, wherein said coupling-in gratings are each characterized by a respective grid constant, and wherein said grid constants differ from one another.

2. The invention of claim 1 wherein the diffraction grating defines a symmetry axis; wherein the coupling-in gratings run in the same direction as the diffraction grating; and wherein the coupling-in gratings are offset transversely to the symmetry axis of the diffraction grating.

3. The invention of claim 1 wherein the measuring system measures the relative position of the two objects along a measuring direction; and wherein the coupling-in gratings are offset with respect to one another along the measuring direction.

4. The invention of claim 2 wherein the measuring system measures the relative position of the two objects along a measuring direction; and wherein the coupling-in gratings are offset with respect to one another along the measuring direction.

5. The invention of claim 1 wherein both of the coupling-in gratings are arranged in a single plane oriented parallel to the diffraction grating.

6. The invention of claim 2 wherein both of the coupling-in gratings are arranged in a single plane oriented parallel to the diffraction grating.

7. The invention of claim 3 wherein both of the coupling-in gratings are arranged in a single plane oriented parallel to the diffraction grating.

8. The invention of claim 4 wherein both of the coupling-in gratings are arranged in a single plane oriented parallel to the diffraction grating.

9. The invention of claim 1 wherein the two coupling-in gratings are aligned with one another in the measuring direction.

10. The invention of claim 1 wherein the two coupling-in gratings are disposed in separate respective planes oriented parallel to the diffraction grating and spaced from one another.

11. The invention of claim 9 wherein the two coupling-in gratings are disposed in separate respective planes oriented parallel to the diffraction grating and spaced from one another.

12. The invention of claim 1 wherein the coupling-in gratings are both disposed in a common plane oriented parallel to the diffraction grating, and wherein the optical waveguide associated with one of the coupling-in gratings passes to one side of the other coupling-in grating.

13. The invention of claim 9 wherein the coupling-in gratings are both disposed in a common plane oriented parallel to the diffraction grating and wherein the optical waveguide associated with one of the coupling-in gratings passes to one side of the other coupling-in grating.

* * * * *

UNITED STATES PATENT AND TRADEMARK OFFICE
CERTIFICATE OF CORRECTION

PATENT NO. : 4,923,300

DATED : May 8, 1990

INVENTOR(S) : Dieter Michel et al.

It is certified that error appears in the above-identified patent and that said Letters Patent is hereby corrected as shown below:

In column 3, line 6, please delete "H1" and substitute therefor --+H1--.

In column 4, line 19, after the second occurrence of "the" please insert --measuring direction of the diffraction grating G4.--.

In column 4, line 35, please delete "HG4" and substitute therefor --+HG4--.

In column 4, line 36, after "another" please insert --in the measuring direction. However, it is apparent--.

Signed and Sealed this

Eighth Day of September, 1992

Attest:

DOUGLAS B. COMER

Attesting Officer

Acting Commissioner of Patents and Trademarks